United States Patent
Rucklidge et al.

(10) Patent No.: US 6,449,718 B1
(45) Date of Patent: Sep. 10, 2002

(54) METHODS AND APPARATUS FOR PARTIAL ENCRYPTION OF TOKENIZED DOCUMENTS

(75) Inventors: William J. Rucklidge, Mountain View, CA (US); Daniel P. Huttenlocher, Ithaca, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/288,733

(22) Filed: Apr. 9, 1999

(51) Int. Cl.⁷ .................................................. G06F 1/24
(52) U.S. Cl. ...................... 713/168; 713/172; 713/179; 713/185
(58) Field of Search ................................. 713/168, 172, 713/179, 185, 200, 201

(56) References Cited

U.S. PATENT DOCUMENTS 5,778,095 A 7/1998 Davies ...................... 382/225
6,047,251 A * 4/2000 Pon et al. .................. 382/229

* cited by examiner

Primary Examiner—Thomas R. Peeso
(74) Attorney, Agent, or Firm—Fliesler Dubb Meyer & Lovejoy LLP (57) ABSTRACT

A technique that partially encrypts tokenized documents is disclosed. An electronic document image is generated from the document. A plurality of tokens are stored as a dictionary, wherein the tokens represent shapes contained in the document. A plurality of triples comprising a token identification (ID) and a corresponding position are generated from the document image, such that the token ID identifies a token from the dictionary that corresponds to a shape in the document image at the corresponding position. The token IDs are encrypted. The output representation for the secured document comprises encrypted token IDs, positions and a dictionary of tokens. Encoding techniques that reduce the size of the secured document are also disclosed. A trusted image output terminal, for use in document reconstruction, includes a single integrated circuit that performs the decrypting function and the page rendering function to significantly reduce the ability to capture the electronic document in the clear.

24 Claims, 7 Drawing Sheets

METHODS AND APPARATUS FOR PARTIAL ENCRYPTION OF TOKENIZED DOCUMENTS

BACKGROUND OF THE INVENTION

1. Field of the Invention

The present invention is directed toward the field of controlling access to electronic documents, and more particularly toward the field of securing information through partial encryption of tokenized documents.

2. Art Background

Information contained in documents is a valuable commodity in society. The ability to control distribution of documents is partially dependent upon the ownership of intellectual property rights in the documents. One way of generating revenue from the ownership of documents is through the sale or license of the documents. In an outright sale, a user may purchase from an information provider all rights associated with information contained in the document. As an owner of the rights in the document, the user is permitted to copy, distribute, or re-use the information in any form. However, the outright sale of rights in the document may demand a high price. Furthermore, the information provider may not desire to sell all rights in the document. Thus, a purchaser of documents may only want to buy limited rights in documents (i.e., obtain a license for limited rights in the document). One licensing scheme may set a license fee for the document dependent upon the rights conferred to the licensee (i.e., the purchaser of limited rights in the document). For example, a user may purchase from an information provider the right to use a single copy of the document. Having only the right to posses a single copy of the document, the user does not have a right to copy the document or re-use portions of the document. Accordingly, it is desirable for an information provider to control the use of a document by a user based on the rights conferred to the user.

Currently, information and documents are most easily distributed in an electronic form. Electronic documents provide fast, economic and efficient distribution of information not known through conventional techniques of distributing paper or hard copies. However, the distribution of electronic copies of documents significantly increases the issues of access control. Once the user has an electronic document in the clear, the user can easily copy the document, distribute the document, and re-use all or portions of the document to create an additional document. To prevent unauthorized use of an electronic document, information providers may encrypt the electronic version of the document. Encryption, although effective, may require substantial processing resources, and thus encumber the effective use of the electronic document. Accordingly, it is desirable to develop techniques that provide an adequate level of security while minimizing the processing required to recover the document.

SUMMARY OF THE INVENTION

A technique that partially encrypts tokenized documents generates secure documents while minimizing the processing required to reconstruct the document. An electronic document image is generated from the document. A plurality of tokens are stored as a dictionary, wherein the tokens represent shapes contained in the document. A plurality of triples comprising a token identification (ID) and a corresponding position are generated from the document image, such that the token ID identifies a token from the dictionary that corresponds to a shape in the document image at the corresponding position. To secure the contents of the document, the token IDs are encrypted. The secured document comprises encoded positions (x, y), encrypted token IDs and a dictionary of tokens.

In one embodiment, to reduce the size of the secured document, the positions in the sequence of triples are encoded. For this embodiment, the positions are differentially encoded, so as to only store information that identifies a position relative to a proceeding position. In another embodiment, each triple in the sequence is augmented with a color designation to include color in the secured document. If desired, contone color is included in the output representation by augmenting each triple in the sequence with JPEG compressed images.

Document reconstruction in the partial encryption of tokenized document technique includes receiving the dictionary of tokens, encrypted token identification (IDs) and their corresponding positions in the document. The encrypted token IDs are decrypted to generate token IDs. The original document image is then reconstructed from the token IDs and positions by generating a shape corresponding to a shape in the dictionary identified by a token ID at a location identified by a. corresponding position. In one embodiment, a trusted image output terminal includes a single integrated circuit that performs the decrypting function and the page rendering function to significantly reduce the ability to capture signals of the electronic document in the clear.

DETAILED DESCRIPTION

Figure 1:
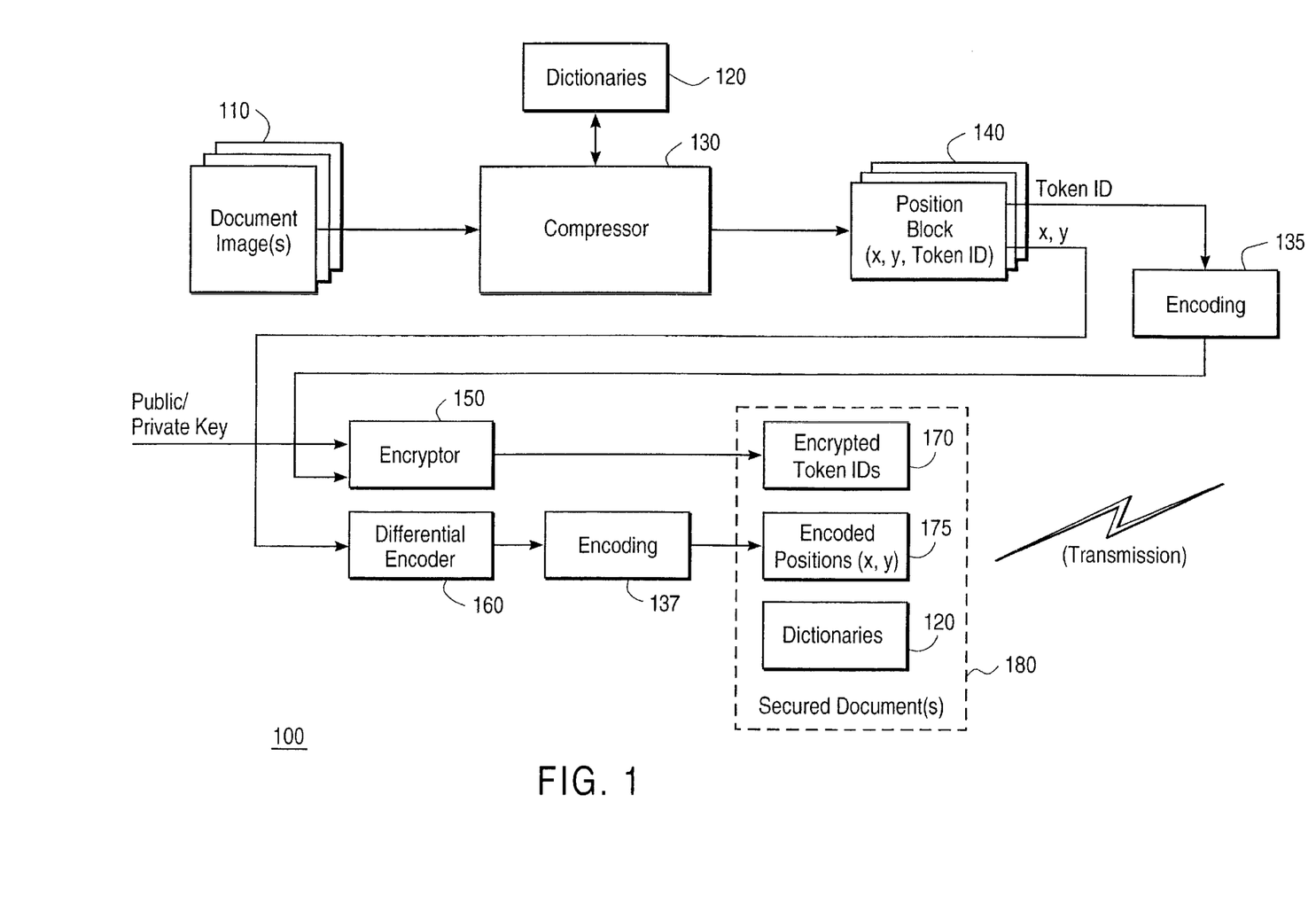
FIG. 1 is a block diagram illustrating one embodiment for partial encryption of tokenized documents.

FIG. 1 is a block diagram illustrating one embodiment for partial encryption of tokenized documents. A document generation system 100 processes document images 110 to generate secured documents 180. Document images 110 represent a broad category of information residing as electronic images. The document images 110 may include a compilation of information from any source. For example, the document images 110 may be information stored on a computer system as electronic images. Also, the document images 110 may be accessed via a network, and stored at one or more remote locations. The content of document images 110 may include articles, books, periodicals, etc. The document images 110 may be stored in any well known format for storing electronic documents.

For the embodiment shown in FIG. 1, the document images 110 are input to a compressor 130. In general, the compressor 130 receives, as input, the document images 110, and generates a compressed version of the document images 110 (i.e, reduces the number of bits required to represent the document image). For this embodiment, the document generation system 100 utilizes a token based document image compression scheme.

In general, token based document image compression involves processing the document images 110, which represent pages of a document, by searching the document images for distinctive shapes. For example, the letter "T", appearing in a particular font and size, has a distinctive shape. The shape of the letter "T" occurs multiple times throughout the document. For this example, the letter "T" is stored as a shape or token in a collection of dictionaries. For each shape or token encountered in a document, the corresponding shape or token is stored in a dictionary. After compression, the dictionaries contain the individual shapes or tokens that make up the document images. Note that the dictionaries are compilations of shapes only, and they do not reveal how the shapes are arranged in a corresponding document. In the document generation system 100, the compilation of shapes and tokens for document images 110 is represented as dictionaries 120.

The compressor 130 generates a position block for each page of the document image. In general, the position block identifies, for each page, locations and the corresponding shape or token that appears in the corresponding position. In the document generation system 100, the position block is labeled position block 140, and consists of a stream of triples, (x, y, token ID).

In one embodiment, the document generation system 100 employs a low level encoding scheme to further reduce the size of the document image. The bit level encoding scheme is shown in FIG. 1 as encoding 135. In one embodiment, encoding 135 employs a Huffman encoding or compression scheme. A bit level encoding scheme, such as Huffman compression, is well known in the art and will not be described further.

As shown in FIG. 1, the token ID portion of the position block (encoded) is input to encryptor 150, and the position portion (i.e., x, y) is input to differential encoder 160. The encryptor 150 encrypts the stream of token IDs for each position block. Any encryption technique may be used to encrypt the stream of token IDs. For example, encryptor 150 may employ a private key cryptography scheme or a public key cryptography scheme. Various techniques for both public key cryptography and private key cryptography are well known in the art and will not be described further.

The position portion (i.e, x, y) of position block 140 is encoded in differential encoder 160 to reduce the size of the position block. Also, bit level encoding is performed in encoding 137 on the differentially encoded positions (x, y). For transmission, the secured document consists of the encoded positions (x, y) and encrypted token IDs. The compilation of shapes for dictionaries 120 are also transmitted with the document, and thus are part of secured document 180 as well.

Figure 2:
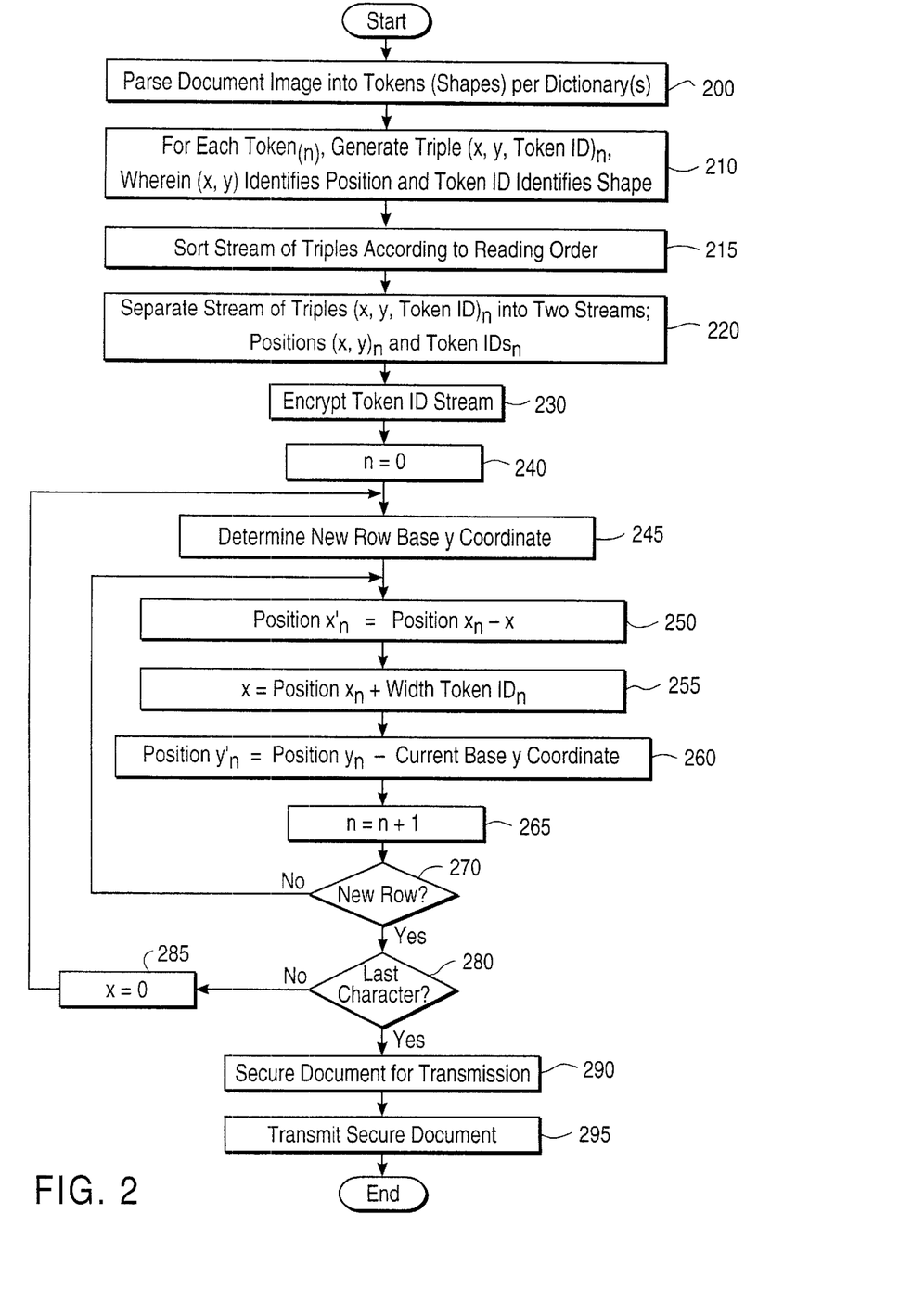
FIG. 2 is a flow diagram illustrating one embodiment for document generation using the partial encryption of tokenized document techniques of the present invention.

FIG. 2 is a flow diagram illustrating one embodiment for document generation using the partial encryption of tokenized document techniques of the present invention. As shown in block 200, the document images are parsed into tokens or shapes per the compilation of shapes in the dictionaries 120. For each token, token$_n$, a triple (x, y, token ID)$_n$, is generated as shown in block 210. The (x, y) identifies the position, and the token ID identifies the corresponding shape at that position. As shown in block 220, the stream of triples, (x, y, token ID)$_n$, is separated into two streams: positions (x, y)$_n$ and token IDs$_n$. The stream of token IDs are encrypted (block 230).

The differential encoding of the position block improves compression by utilizing the fact that the token positions are not randomly distributed. Instead, in one embodiment, the token positions are organized into lines of text. For this embodiment, the differential encoder 160 (FIG. 1) encodes the token positions in generally the order in which the document images are read (i.e., line by line from left to right). To implement this embodiment, the triples are sorted into a general approximation of text lines organized from top-to-bottom. For each text line, the triples are sent left-to-right. As discussed below, the encoding reflects the space between the previous token's right-hand edge and the current token's left-hand edge.

For the embodiment of FIG. 2, differential encoding is used to further reduce the size of positions in the position block. For each "x" position of a triple, the differential encoder 160 encodes the difference from the "x" position of the previous triple minus the width in pixels of the previous triple's token. For example, if the horizontal or x position for a position block is 100, the token ID corresponding to the position $x_n$ is 8 pixels in length, and there are two additional spaces between where position $x_n$ and the proceeding image, then differentially encoded position $x_n$ is stored as "2". Specifically, for each position, position $x_n$, and a subsequent position in a single row, a difference between the prior position and the subsequent position is calculated to generate the differentially encoded position, position $x_n$. As shown in blocks 250 and 255, position $x_n$ is calculated by subtracting "x" from the current position $X_n$, and updating x to be the current position. To differentially encode the vertical position y, entitled position $y_n$, the position for the current row is subtracted from the current character, thereby storing only the difference. This expression is shown in block 260 of FIG. 2. For example, if the vertical position for position $y_n$ is 50, and the current base y coordinate is 50, then the position $y_n$ is 0 (i.e., there is no difference between the vertical positions of this token ID and the current row). The algorithm for differentially encoding the position portion of the position block is shown in blocks 240, 250, 255, 260, 265, 270, 280 and 285 of FIG. 2.

As shown in block 290 of FIG. 2, the secured document, which includes the encrypted token IDs and differentially encoded positions, are assembled to create, in part, the secured document. The encrypted token IDs and positions along with the compilation of dictionaries, are now available for use as a secured document. For example, the secured document may be transmitted to a designated recipient (block 295).

In one embodiment, the partial encryption of tokenized documents technique includes documents with color. For this embodiment, color information is included in the secured document 180 by labeling each position block (x, y), with the corresponding color. In the document reconstruction system (FIG. 5), the color information for a position is extracted to generate color at the corresponding position on a document image. Contone color information is included by adding to a document page JPEG-compressed images. The contone color is drawn as background to the document image page. Alternatively, the contone color information may be clipped by a mask during document reconstruction.

The partial encryption of token based documents technique of the present invention is an efficient technique that provides relatively high security. The technique, which only encrypts the sequence of token IDs and leaves the encoded positions, token dictionaries and color information in the clear, substantially reduces the amount of processing to recover a secured document from a technique that encrypts the entire position block. Typically, the token ID stream accounts for approximately 10 to 30% of the bits in the document. Accordingly, there is, on average, a five-fold reduction in the number of bits that must be encrypted to generate a document and that must be decrypted to recover a document. This efficiency is on top of the reduction in the document image file size obtained by using a token-based document representation. Typically, a token-based document representation reduces the file size between three to ten times the original size. Accordingly, overall, the partially encrypted token based document compression has approximately thirty times fewer encrypted bits than the number of bits that would be required to fully encrypt the original document images.

Security of Partial Encryption of Tokenized Documents:

The partial encryption of tokenized documents technique of the present invention provides a fairly high level of security that protects unauthorized copying of a secured document. However, this technique does provide the untrusted user access to some of the information contained in the secured document. The dictionaries 120 (FIG. 1), which are sent in the clear,. contain only shapes. No position information that identifies where the shape occurs in the document is provided with the dictionaries. Thus, the ability to read the dictionaries only allows the untrusted user to see what shapes are used in the documents. This is equivalent to knowing what fonts were used to construct the documents.

Figure 5:
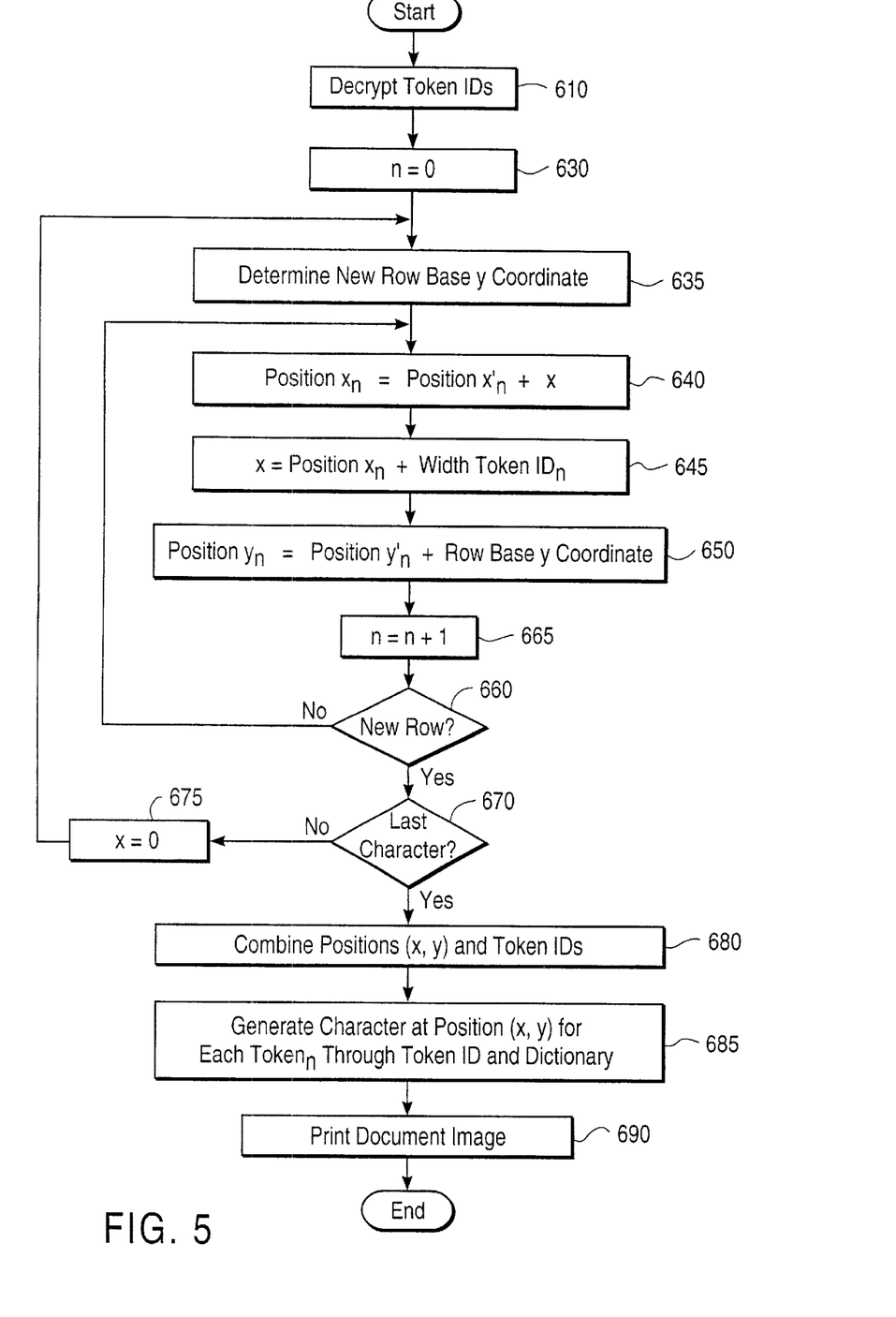
FIG. 5 is a flow diagram illustrating one embodiment for document reconstruction with partially encrypted tokenized documents.

Some documents may include a shape that appears only once in the document. For example, a line drawing unique to a particular document may occur only a single time in the document. Thus, these shapes are visible to the untrusted user in the dictionaries. In one embodiment, to protect the content information of the character, the character is encrypted. For this embodiment, additional processing is required to decrypt and to uncover the secured document. In another embodiment, the unique shape is partitioned into arbitrary sub-shapes. For example, if the unique shape is a line, then the line is divided into smaller line segments. For this embodiment, the original shape is reconstructed in the document reconstruction system (FIG. 5). The sub-shapes stored in the dictionaries contain little information. This technique of dividing original shapes into sub-shapes increases the compression ratio in the compressor 130 (FIG. 1) because multiple triples must be used to instruct the document reconstruction system (FIG. 5) on how and where to reconstruct the sub-shapes. However, this technique does not increase the amount of processing required to encrypt the token IDs.

The position information (i.e., x, y) in the position block 140 is not enough information to reconstruct the content of the document. The information encoded in the differential encoder 160 (FIG. 1) is a sequence of inter-character spaces from which the untrusted user could gain little information. However, it is possible to extract, to some degree of accuracy, the word length and to identify characters that have descenders. The ability to extract this information may be reduced by using a more sophisticated position block encoder (i.e., more sophisticated than the differential coding technique). An untrusted user could, using natural language models and having an expectation of the document contents, reconstruct some of the text of the document. Accordingly, this technique may not be the preferred technique for highly sensitive and confidential documents. However, for most applications involving documents whose content is not extremely sensitive, the techniques of the present invention provide adequate protection.

The color information, if present in the secured document, is also not very useful to the untrusted user in determining the content of the document. In general, the color information only discloses that some sequence of tokens occurred in a particular color. The color information is sent in the clear (i.e., the color information in the position block is not encrypted). Since the color information is available to the trusted printer (FIG. 6) prior to decryption processing, the untrusted component of the printer performs pre-processing steps using the color information. For example, the untrusted component of the printer may pre-process trapping or line thickening using the color and shape information. This further reduces the amount of processing required in the "trusted component" portion of the printer, thereby reducing the ability to compromise the secured document.

The contone information, if present, is also sent in the clear (i.e., the contone information is not encrypted). If the principal value of the document is a collection of images represented in the contone information, then sending contone information in the clear is not an appropriate technique. Sending the contone information in the clear is an attempt to prevent access to the textual portion of the document, and thus assumes that the text is the valuable portion of the document.

Figure 3:
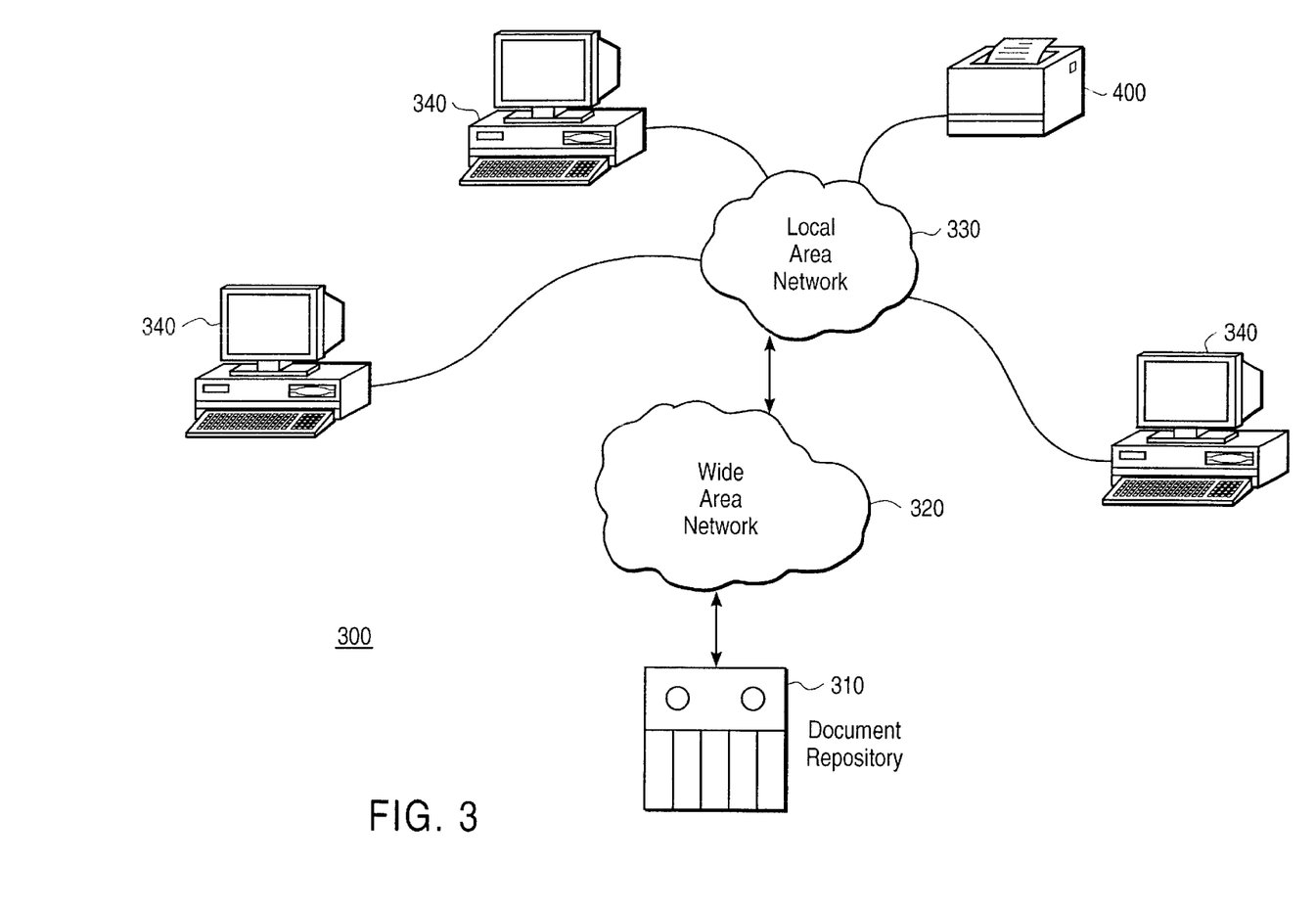
FIG. 3 illustrates a network for transmission of a secured document for use with the present invention.

Secured Document Distribution:

FIG. 3 illustrates a network for transmission of a secured document for use with the present invention. Documents 180 are stored in a document repository 310. Document repository 310, depicted as a large storage medium in FIG. 3, represents a broad category of storage devices suitable for storing a repository of documents. The documents are stored in the document repository 310 as "secured documents" 180 (i.e., the documents are processed to include partial encryption of tokenized documents). For the example document distribution system shown in FIG. 3, the document repository 310 is coupled to a wide area network 320. Wide area network 320 represents a broad category of transmission medium used to distribute information globally. Local area network 330 is also shown on FIG. 3. Local area network 330 couples a plurality of personal computers, labeled 340. A trusted printer 400 is also coupled to the local area network 330. For purposes of illustration, the personal computers 340 transmit electronic documents to trusted printer 400 to obtain paper printed images of documents.

For the example network shown in FIG. 3, secured documents 180 are transmitted to one or more personal computers 340 via wide area network 320 and local area network 330. The secured documents 180 may be stored on a server for the local area network 330 or any one or more of the personal computers 340. At this point, the secured document cannot be viewed electronically by a user of a personal computer 340. Thus, even if a user makes multiple copies of a document in an electronic form, the secured document is not useful to the user.

To view the content of the secured document in the example of FIG. 3, the user transmits the secured documents 180 to the trusted printer 400. The document reconstruction system (FIG. 5) is implemented in the trusted printer 400. As such, the trusted printer 400 decompresses and decrypts the secured document 180 and prints a document image on paper. The user may then view the document as a hard copy.

Figure 4:
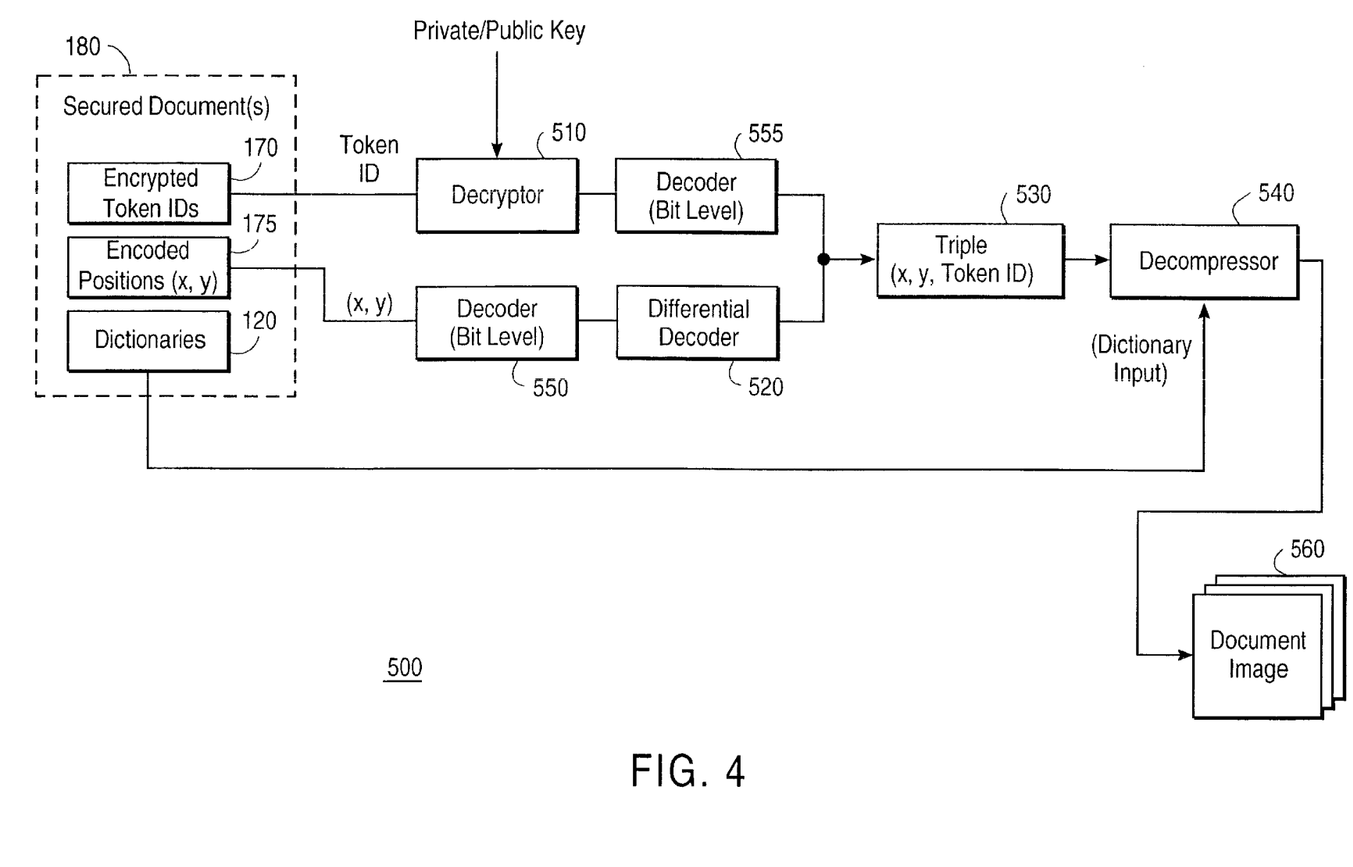
FIG. 4 is a block diagram illustrating one embodiment for a document reconstruction system for use with the partial encryption of tokenized documents technique.

Document Reconstruction:

FIG. 4 is a block diagram illustrating one embodiment for a document reconstruction system for use with the partial encryption of tokenized documents technique. A document reconstruction system 500 receives, as an input, secured documents 180, and generates, as an output, a document image 560. As described below, the document image 560 may be a hard copy printed on paper (See FIGS. 3 and 6). As discussed above, the secured documents 180 include the encrypted token IDs, positions and dictionaries 120. The encrypted token IDs 170 are input to decryptor 510. The decryptor 510 decrypts the token IDs in accordance with the encryption scheme used in the encryptor 150 (FIG. 1). Also, as shown in FIG. 4, decryptor 510 receives a private/public key from an individual authorized to view the document. A decoder, labeled 550 on FIG. 4, decodes the positions (x, y) on a bit level. A differential decoder 520 receives the positions from the decoder 550, and differentially decodes the positions. A bit level decoder 555 decodes the token IDs in accordance with the encoding 135 (FIG. 1) scheme. As shown in FIG. 4, the position block is re-combined into a stream of triples 530 with the decoded position (x, y) and the decrypted token ID. The stream of triples 530 is then input to decompressor 540. Decompressor 540 receives dictionaries 120 to generate shapes designated by token IDs at the corresponding positions (x, y). The output of document reconstruction system 500, in a human readable form, is shown as document image 560.

FIG. 5 is a flow diagram illustrating one embodiment for document reconstruction with partially encrypted tokenized documents. The secured document is divided into positions (x, y) and token IDs for each of "n" tokens in the document (block 600). With user provided keys, the token IDs are decrypted (block 610). The positions (x, y) are differentially decoded as set forth in the algorithm in blocks 630, 635, 640, 645, 650, 660, 665, 670 and 675. Although differential encoding/decoding is described herein, any technique that reduces the ability to derive the content information from the position information and dictionaries may be used without deviating from the spirit or scope of the invention. The positions (x, y) and corresponding token IDs are recombined (block 680). Shapes from the dictionaries, identified by the token IDs, are generated at the corresponding positions (block 685). The document is printed on paper to provide a hard copy of the document (block 690).

Figure 6:
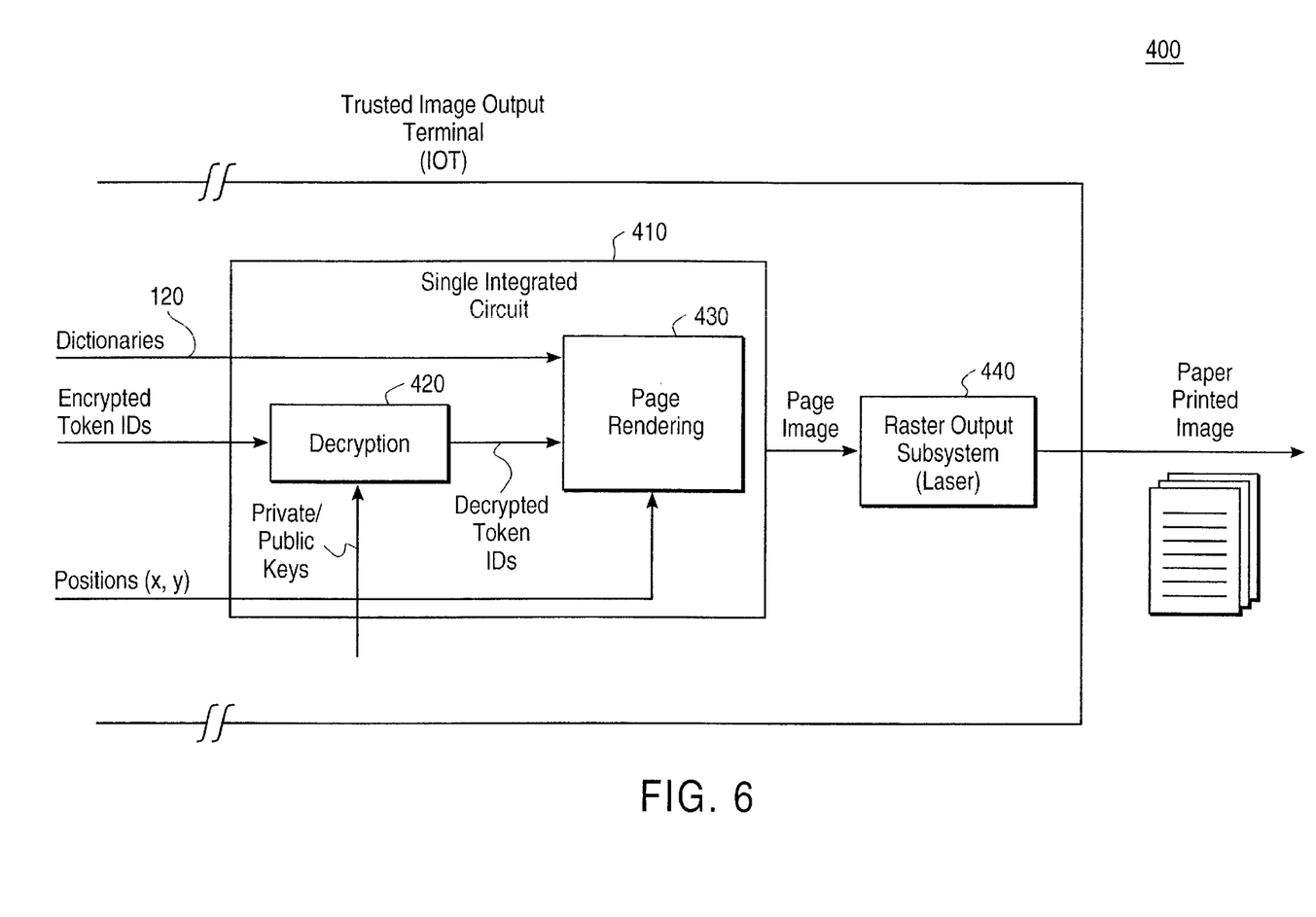
FIG. 6 is a block diagram illustrating one embodiment for a trusted image output terminal for use with the partial encrypting of tokenized documents technique.

FIG. 6 is a block diagram illustrating one embodiment for a trusted image output terminal for use with the partial encrypting of tokenized documents technique. A trusted image output terminal 400 includes, in part, a document reconstruction system implemented on a single integrated circuit 410. In one embodiment, the trusted image output terminal 400 is a laser printer; however, any printing technology may be used in conjunction with the techniques of the present invention. As shown in FIG. 6, the single integrated circuit 410 includes decryption 420 and page rendering 430. In general, the decryption 420 receives the encrypted token IDs and public/private keys, and generates decrypted token IDs. The token IDs, dictionaries, and positions (x, y) are input to page rendering 430. Page rendering 430 decodes the positions (x, y), and decompresses the positions (x, y) and token IDs to generate a page image. The page image is the output of the integrated circuit 410. A raster output subsystem 440 (laser) receives the page image, and generates the page image on paper to produce a hard copy of the document. In one embodiment, the single integrated circuit 410 is implemented with an application specific integrated circuit chip (ASIC).

As shown on FIG. 6, the processing to decrypt the token IDs and to render the page images are successive. This allows implementation of both the decryption and page rendering functions in the single integrated circuit 410. Integrating the decryption and page rendering functions in a single integrated circuit 410 makes access to the decrypted token ID stream extremely difficult. For example, an untrusted user tampering with the trusted image output terminal in an attempt to capture the decrypted document in electronic form would have to access internal data paths in the single integrated circuit 410. This task is extremely difficult. As shown by the lines in FIG. 6, the untrusted user may capture the partially encrypted data stream external to the single integrated circuit chip 410. However, the user already has access to the partially encrypted tokenized document. On the output of the integrated circuit chip 410, an untrusted user could capture the page image. However, capturing the page image is equivalent to a noise-free scanning of the paper that the printer produces. At the output stage of the single integrated circuit, printing of the paper image is imminent. Based on the trusted image output terminal 400 of FIG. 6 and a document distribution network example of FIG. 3, an untrusted user cannot gain access to the decrypted electronic version of the document, and therefore cannot make unauthorized copies of the electronic version of the document.

Figure 7:
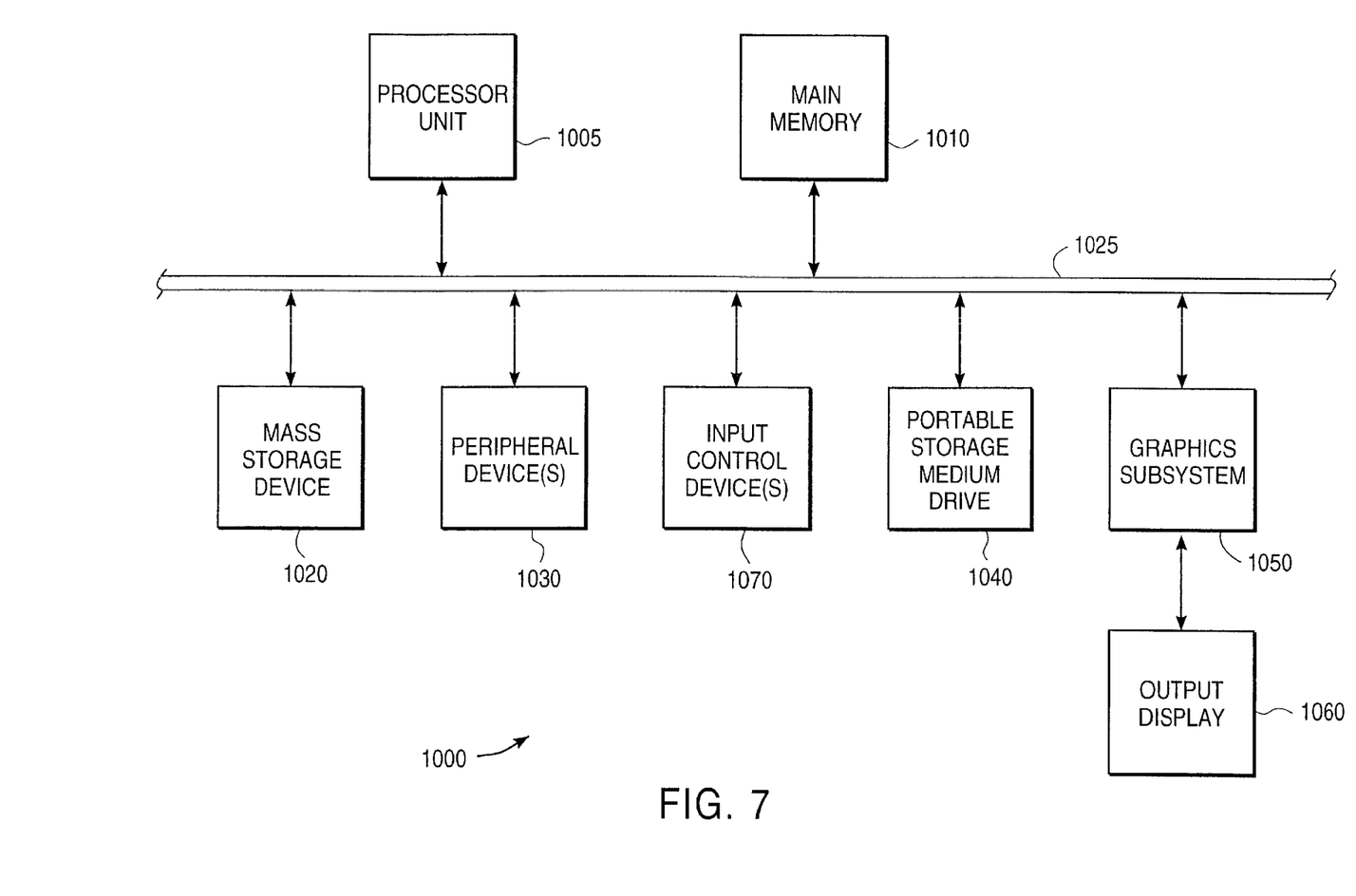
FIG. 7 illustrates a high level block diagram of a general purpose computer system in which the partial encryption of tokenized documents technique of the present invention may be implemented.

Computer System:

FIG. 7 illustrates a high level block diagram of a general purpose computer system in which the partial encryption of tokenized documents technique of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the partial encryption of tokenized documents technique of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 7 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the partial encryption of tokenized documents software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the partial encryption of tokenized documents software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, documents may be input to the computer system 1000 via a portable storage medium or a network for processing by the partial encryption of tokenized documents software.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The partial encryption of tokenized document techniques, including the document generation system and the document reconstruction system may be implemented in either hardware or software. For the software implementation, the document generation and document reconstruction systems are software that includes a plurality of computer executable instructions for implementation on a general purpose computer system. Prior to loading into a general purpose computer system, the document generation and document reconstruction system software may reside as encoded information on a computer readable medium, such as a magnetic floppy disk, magnetic tape, and compact disc read only memory (CD-ROM). In one hardware implementation, the document generation and document reconstruction systems may comprise circuits, implemented on a single integrated circuit as shown in FIG. 6.

Although the present invention has been described in terms of specific exemplary embodiments, it will be appreciated that various modifications and alterations might be made by those skilled in the art without departing from the spirit and scope of the invention.

What is claimed is:

1. A method for partially encrypting a tokenized document, said method comprising the steps of:
   generating, from a document, a document image;
   storing a plurality of tokens for use as at least one dictionary, wherein a token represents a shape;
   generating, from said document image, a plurality of triples comprising a token identification (ID) and a corresponding position in said document image, wherein said token ID identifies a token from said dictionary that corresponds to a shape in said document image at said corresponding position; and
   encrypting said token IDs, wherein an output representation for said document comprises encrypted token IDs, positions, and a dictionary of tokens.

2. The method as set forth in claim 1, further comprising the step of encoding said positions so as to reduce the information between two successive positions in said output representation.

3. The method as set forth in claim 2, wherein the step of encoding said positions comprises the step of differentially encoding information between two successive positions.

4. The method as set forth in claim 1, further comprising the step of transmitting said output representation comprising said encrypted token IDs, said positions, and said dictionary of tokens.

5. The method as set forth in claim 1, further comprising the step of assigning each position with a color designation to include color in said output representation of said document.

6. The method as set forth in claim 1, further comprising the step of augmenting each position in said sequence with JPEG compressed images to include contone color in said output representation.

7. A method for reconstructing a tokenized document, said method comprising the steps of:
   receiving at least one dictionary comprising a plurality of tokens, wherein a token represents a shape;
   receiving a representation for a document comprising a plurality of encrypted token identifications (IDs) and corresponding positions in said document image, such that a token ID identifies a token from said dictionary that corresponds to a shape in said document image at a corresponding position;
   decrypting said encrypted token IDs to generate token IDs; and
   generating a document image by generating a shape corresponding to a shape in said dictionary identified by a token ID at a location identified by a corresponding position.

8. The method as set forth in claim 7, further comprising the steps of:
   receiving encoded positions; and
   decoding said encoded positions.

9. The method as set forth in claim 8, wherein the step of decoding said encoded positions comprises the step of differentially decoding two successive positions to obtain absolute coordinates for said positions.

10. The method as set forth in claim 7, further comprising the steps of:
    receiving a color designation for at least one position; and
    generating color at said position in accordance with said color designation.

11. The method as set forth in claim 7, further comprising the steps of:
    receiving contone color for at least one position; and
    generating for said position contone color in said document image.

12. An image output terminal for printing a document image comprising:
    decryption circuitry for receiving a plurality of encrypted token identifications (IDs) and for decrypting said encrypted token IDs to generate token IDs;
    page rendering circuitry for receiving positions corresponding to said token IDs and at least one dictionary comprising a plurality of tokens that represent shapes, said page rendering circuitry being coupled to said decryption circuitry for receiving said token IDs, and for generating a page image from said token IDs, dictionary and positions through identification of tokens from said dictionary that corresponds to a shape in said document image at said corresponding position; and
    a raster output subsystem coupled to said page rendering circuitry for receiving said page image and for generating a paper printed image.

13. The image output terminal as set forth in claim 12, wherein said decryption circuitry and said page rendering circuitry comprise a single integrated circuit device.

14. A computer readable medium comprising a set of instructions stored therein, which when executed by a computer, causes the computer to perform the steps of:

generating, from a document, a document image;

storing a plurality of tokens for use as at least one dictionary, wherein a token represents a shape;

generating, from said document image, a plurality of triples comprising a token identification (ID) and a corresponding position in said document image, wherein said token ID identifies a token from said dictionary that corresponds to a shape in said document image at said corresponding position; and encrypting said token IDs, wherein an output representation for said document comprises encrypted token IDs, positions, and a dictionary of tokens.

15. The computer readable medium as set forth in claim 14, further comprising the step of assigning each position with a color designation to include color in said output representation of said document.

16. The computer readable medium as set forth in claim 15, wherein the step of encoding said positions comprises the step of differentially encoding information between two successive positions.

17. The computer readable medium as set forth in claim 14, further comprising the step of transmitting said output representation comprising said encrypted token IDs, said positions, and said dictionary of tokens.

18. The computer readable medium as set forth in claim 14, further comprising the step of assigning each position with a color designation to include color in said output representation of said document.

19. The computer readable medium as set forth in claim 14, further comprising the step of augmenting each position in said sequence with JPEG compressed images to include contone color in said output representation.

20. A computer readable medium comprising a set of instructions stored therein, which when executed by a computer, causes the computer to perform the steps of:

receiving at least one dictionary comprising a plurality of tokens, wherein a token represents a shape;

receiving a representation for a document comprising a plurality of encrypted token identifications (IDs) and corresponding positions in said document image, such that a token ID identifies a token from said dictionary that corresponds to a shape in said document image at a corresponding position;

decrypting said encrypted token IDs to generate token IDs; and generating a document image by generating a shape corresponding to a shape in said dictionary identified by a token ID at a location identified by a corresponding position.

21. The computer readable medium as set forth in claim 20, further comprising the steps of:

receiving encoded positions; and decoding said encoded positions.

22. The computer readable medium as set forth in claim 21, wherein the step of decoding said encoded positions comprises the step of differentially decoding two successive positions to obtain absolute coordinates for said positions.

23. The computer readable medium as set forth in claim 20, further comprising the steps of:

receiving a color designation for at least one position; and generating color at said position in accordance with said color designation.

24. The computer readable medium as set forth in claim 20, further comprising the steps of:

receiving contone color for at least one position; and generating for said position contone color in said document image.

* * * * *